Wm. W. STILLMAN,

*Assignor to*

Ralph Emerson, Plow-Coulter.

No. 4,597. Reissued Oct. 17, 1871.

*Witnesses:-*

W. H. Rowe,

Joe S. Payton

*Inventor:-*

Wm. W. Stillman by his Atty

Wm. D. Baldwin

AM. PHOTO-LITHOGRAPHIC CO. N.Y. (OSBORNE'S PROCESS.)

UNITED STATES PATENT OFFICE.

WILLIAM WARREN STILLMAN, OF MOUNT HAWLEY, ASSIGNOR TO RALPH EMERSON, OF ROCKFORD, ILLINOIS.

IMPROVEMENT IN PLOW-COLTERS.

Specification forming part of Letters Patent No. 57,007, dated August 7, 1866; reissue No. 4,597, dated October 17, 1871.

*To all whom it may concern:*

Be it known that I, WILLIAM WARREN STILLMAN, of Mount Hawley, in the county of Peoria and State of Illinois, have invented certain new and useful Improvements in Colters for Plows, of which the following is a specification:

My invention relates to colters of the class known as swiveling colters. Its objects are to limit the vibrations of the colter while permitting it to swivel freely enough to follow the line of draft of the plow; to render the colter adjustable both vertically and laterally; and to adapt it to be easily applied to an ordinary plow-beam without cutting into the beam; to which ends the improvements herein claimed consist, First, in securing the colter to the plow-beam by means of a laterally-adjustable clamp. Second, in rendering the colter-spindle adjustable vertically relatively to the plow-beam. Third, in limiting the vibrations of the colter by means of an adjustable stop, which at the same time controls the vertical adjustment of the colter-spindle.

Figure 1:
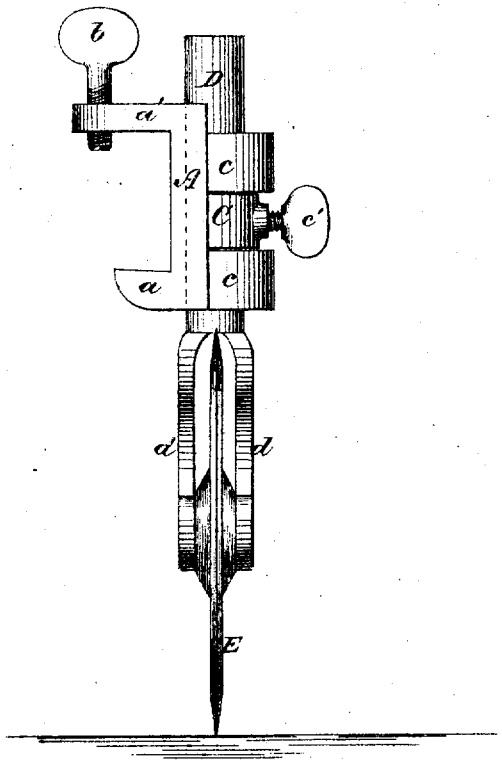
Figure 2:
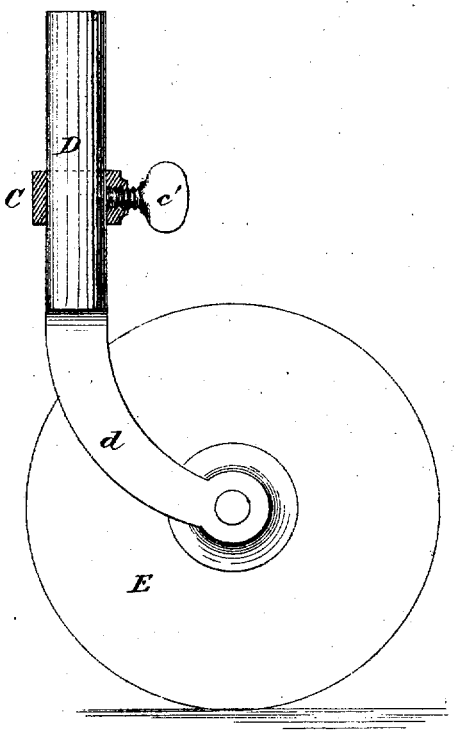
Figure 3:
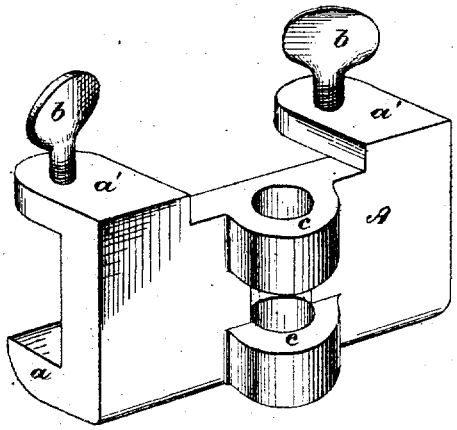

In the accompanying drawing, Figure 1 shows a view in elevation of the colter and clamp as seen from the front, the colter being turned so as to show the set-screw which holds the colter-spindle when adjusted vertically and limits the vibration of the colter. Fig. 2 shows a side elevation of the colter with its collar in section and the set-screw turned parallel with the colter. Fig. 3 shows a view in perspective of the clamp.

The clamp A is constructed with a lower jaw or flange, *b*, and and an upper one, *a'*. The lower jaw, it will be observed, is not exactly parallel with the upper one, but its inner face is inclined slightly upward and inward to give a firmer hold upon the beam. The upper jaw has holes in it, through which pinch-screws *b* pass, to hold the clamp securely upon the beam. The back of the clamp is provided with perforated lugs or eyes *c c*, through which the spindle D of the colter E passes. The colter is a disk of usual construction mounted in bearings in the forked arms *d* of the spindle. A collar, C, fits loosely over the spindle between the eyes *c*. A set-screw, *c'*, locks the spindle and collar together when desired. The clamp, it will be observed, can be adjusted laterally upon the beam and clamped in any desired position relatively thereto. The colter can be adjusted vertically by sliding it endwise through the eyes and the collar and clamping it to the collar by means of the set-screw. The collar, while free to turn horizontally, is held vertically by the eyes, and thus keeps the colter at the desired height. As the collar can turn freely round the spindle, the set-screw can be set in any position desired relatively to the clamp and to the colter-disk, so that the latter may be allowed to swivel freely to conform to slight deviations of the plow-beam from the line of draft; but is limited in its vibrations by the clamp.

I thus by my invention secure an effective swiveling colter, limited in its vibrations and adjustable both vertically and laterally relatively to the plow-beam. Moreover, as the clamp does not encircle the beam entirely, it is easily removed or replaced, and as no cutting of the beam is necessary, its strength remains unimpaired.

I am aware that swivelling colters, limited in their vibrations, are old, and do not claim them broadly; neither do I broadly claim a clamp for holding a colter to a plow-beam.

I claim as my invention—

1. The clamp, constructed as hereinbefore described, with jaws to embrace the upper and lower sides of the plow-beam, pinch-screws to clamp the beam, and eyes for the colter-spindle, to adjust the colter laterally, as set forth.

2. The combination of the eyes on the clamp, the colter-spindle adjustable endwise therein, the collar embracing the spindle between the eyes, and the pinch-screw clamping the collar on the spindle, substantially as set forth, to adjust the spindle vertically.

3. The combination of the colter, its spindle, the collar, the clamp, and the set-screw; all these parts being constructed and operating in combination substantially as set forth, to limit the vibration of the colter.

4. The combination of the laterally-adjustable clamp, the vertically-adjustable swiveling colter, and the set-screw or stop to limit the vibration of the latter, while allowing it to conform to the line of draft; these members being constructed to operate in combination substantially as before set forth.

WM. W. STILLMAN.

Witnesses:
ABE MASBERRY,
G. W. COCHRAN.

(114